United States Patent

[11] 3,541,994

| [72] | Inventors | Miles F. Meng<br>525-15th St.;<br>Edwin C. Sauey, 734 River Crest Drive,<br>Baraboo, Wisconsin 53913 |
|---|---|---|
| [21] | Appl. No. | 784,794 |
| [22] | Filed | Dec. 18, 1968 |
| [45] | Patented | Nov. 24, 1970 |

[54] CALF STALL
6 Claims, 2 Drawing Figs.

| [52] | U.S. Cl. | 119/20 |
|---|---|---|
| [51] | Int. Cl. | A01k 1/00,<br>A01k 1/02 |
| [50] | Field of Search | 119/27, 20,<br>16, 22 |

[56] References Cited
UNITED STATES PATENTS

| 2,630,097 | 3/1953 | Johansen | 119/20UX |
|---|---|---|---|
| 2,714,367 | 8/1955 | Arnold | 119/27 |
| 3,084,668 | 4/1963 | McMurray et al. | 119/18X |
| 3,105,462 | 10/1963 | Miller | 119/20 |
| 3,209,728 | 10/1965 | Beckers | 119/20 |

*Primary Examiner*—Hugh R. Chamblee
*Attorney*—Bair, Freeman & Molinare

ABSTRACT: An inexpensive, compact, long lasting readily cleaned animal stall arrangement comprising a basic stall with a floor defined by a self-cleaning rodlike grate. The stall arrangement includes an add-on stall having outwardly extending support rods adapted to be received telescopically in frame members of the basic stall and the add-on stall makes use of a wall of the basic stall.

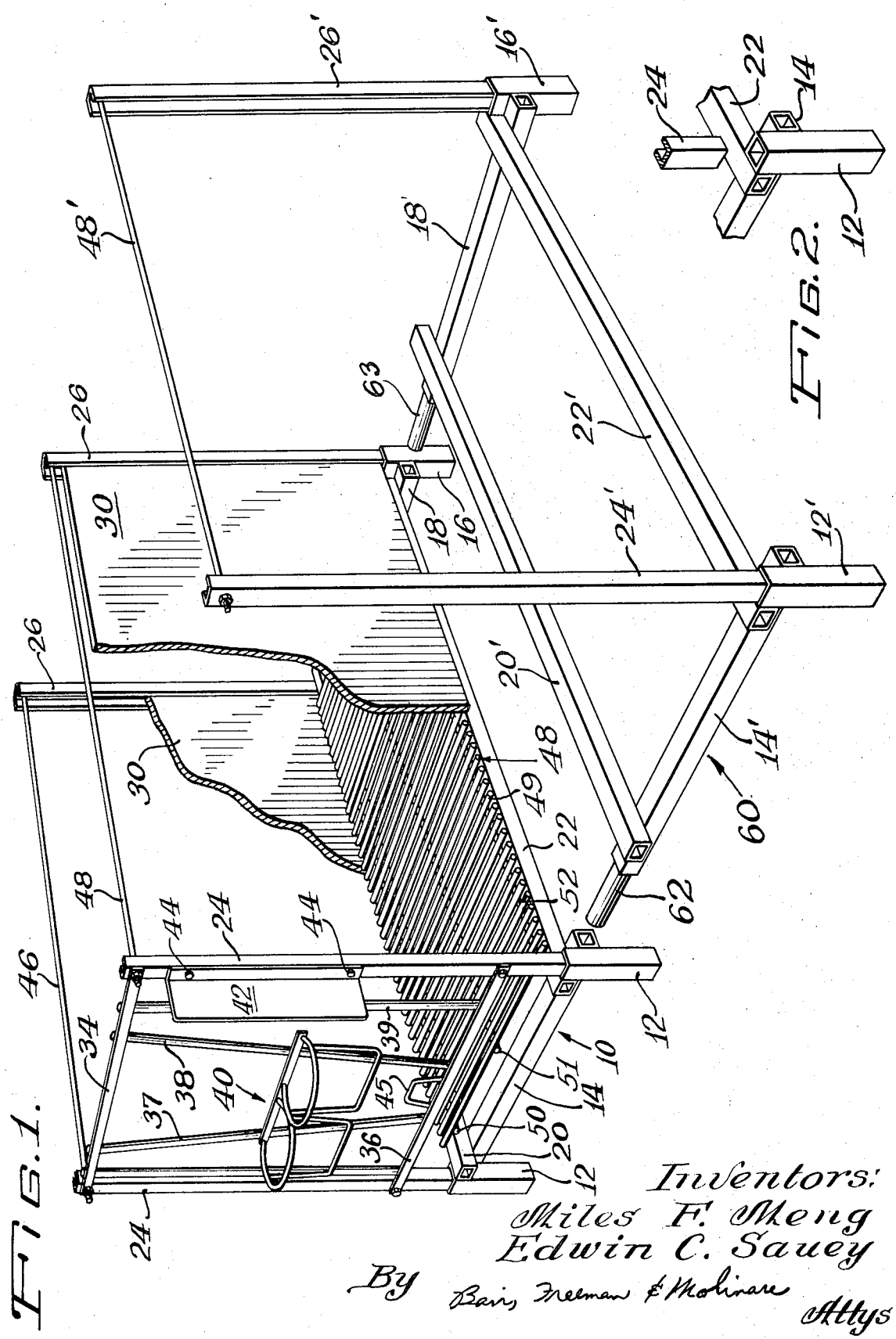

CALF STALL

BACKGROUND OF THE INVENTION

This invention relates to an animal stall arrangement, and, more particularly, to an improved stall arrangement for animals, as, for example, calves, which is compact, long lasting and readily cleaned and disinfected.

Stalls for calves have in the past commonly been constructed of wooden supports and sidings with slat like wooden floors. Assembly of such stalls was quite time consuming. Cleaning of such stalls required considerable labor and yet was really never fully satisfactory. The life of such stalls was generally considered to be relatively short.

Attempts were made to utilize other materials, as, for example, substitution of steel for some of the wooden components, but, such arrangements were generally cumbersome and were relatively complex and expensive.

An object of the present invention is to provide an improved animal stall arrangement comprising a basic stall having self-cleaning grate means defining the floor thereof.

Another object of this invention is to provide an improved animal stall arrangement which includes a self-cleaning grate floor comprised of parallel spaced-apart cylindrical members, such stall arrangement being compact, long lasting, readily assembled and readily cleaned.

A further object of this invention is to provide an improved animal stall arrangement which includes a basic stall and one or more add-on stalls having support rods adapted to be telescopically received in frame members of the basic stall, so as to make use of components of the basic stall for support and so as to utilize a wall of the basic stall as a common wall. Other objects and advantages of the present invention will be made more apparent hereinafter.

BRIEF DESCRIPTION OF THE DRAWING

The attached drawing illustrates a preferred embodiment of the present invention wherein:

FIG. 1 is a perspective view of a basic stall and an add-on stall embodying the present invention, with the add-on stall being illustrated in position just prior to attachment to the basic stall; and FIG. 2 is a perspective view illustrating the telescopic connection of an upright frame member to a tubular support leg.

DESCRIPTION OF THE PREFERRED EMBODIMENT OF THE PRESENT INVENTION

Referring to FIGS. 1 and 2, there is illustrated an animal stall arrangement embodying the principles of the present invention. The stall arrangement includes a basic stall 10 comprising a frame including four upright support legs (only three of which are shown), which upright support legs are joined to one another by crossmembers and are adapted to telescopically receive upright frame members therein. The forward support legs 12 are connected to one another by a front transverse cross or brace member 14 and the rear support legs 16 are connected to one another by a rear transverse cross or brace member 18. The front support legs 12 and the rear support legs 16 are maintained in predetermined spaced relationship by means of the longitudinal cross or brace members 20 and 22, respectively.

In the stall arrangement illustrated, the upright frame or support members include forward frame members 24 and rearward frame members 26, each being comprised of generally U-shaped channel members, with the U's of an associated pair of frame members facing one another or opening toward one another, so as to form a guideway for receiving a wall member 30 therebetween.

Secured to the front of the stall 10 is a front frame which comprises an upper brace 34 and a lower brace 36 spaced from one another by means of bars or rods 37, 38 and 39. The braces 34 and 36 are adapted to be bolted, or otherwise suitably affixed to the upright front support members 24.

Feed-retaining means 40 may be secured to the bars 37 and 38 of the front frame. The feed-retaining means 40 may be in the form of a dual pail holder, as shown, or a single pail holder. Suitably secured to the right-hand front upright support member 24 as seen in FIG. 1, is a headguard 42. The headguard 42 for the calf in the basic stall may be secured to the front upright support member 24 by means of machine screw or like fastening means 44. A tie chain anchor 45 is secured to brace 36.

The upper ends of the respective pairs of front and rear upright support members 24 and 26 are secured to one another by means of tie rods 46 and 48 which are adapted to be connected to associated pairs of channel members after a wall member has been slipped into place between the channel members 24, 26 to retain the wall members in place and to secure the entire stall 10. The ends of the tie rods 46 and 48 are threaded and are adapted to be engaged by nuts after they are in position in the channel members 24, 26 to tighten the assembly.

The floor of the calf stall 10 is defined by a self-cleaning grate 48 comprised of a plurality of cylindrical members 49, 50, 51 and 52. The members 49, 50, 51 and 52 may be tubular or rodlike as shown in FIG. 1. The rods 49 are disposed in parallel spaced-apart relationship transversely of the stall frame and are interconnected by longitudinally disposed brace rods 50, 51 and 52. The ends of the rods 49 extend outwardly beyond the brace rods 50 and 52 and rest upon the top surfaces of the longitudinal crossmembers 20 and 22 for supporting the grate 48 on the crossmembers 20 and 22. The brace rods 50 and 51 are disposed inwardly of the longitudinal crossmembers 20 and 22 of the stall frame a distance slightly less than the spacing between the crossmembers 20, 22 and function to help in orienting the grate 48 properly with respect to the crossmembers 20 and 22.

In one form of the present invention the cylindrical members 49 are five-sixteenths inch in diameter and are spaced apart on one inch centers. The cylindrical configuration of the rodlike members defining the grate 48 and the spacing between such members has been found advantageous in order to properly support the calf without danger that its legs will get caught between adjacent rodlike members, while at the same time allowing droppings from the animal to readily pass through the grate 48. There is little tendency of any droppings to adhere to the cylindrical rodlike members defining grate 48. By this arrangement, the calves are kept clean and costly bedding and labor which is necessary when utilizing stalls with wooden bottoms are eliminated.

The members 49 are preferably provided with a stainless steel paint finish or may be hot-dipped galvanized so as to provide a long lasting shield against rusting. The tubular support members 12, 16 and the crossmembers 14, 18, 20 and 22, together with the upright members 24 and 26 and components of the stall front may be made from metal, as, for example, steel suitably coated or painted to resist rust.

The frame members 14, 18, 20 and 22 may be fabricated from 1 inch by 1 inch steel box beam.

It is seen that the basic stall 10 is compact, thus lowering overall building costs. Labor costs in erection of the stall will be minimized due to its simplicity of construction. The stall 10 may be positioned on a suitable surface in a barn, or it can be positioned over a trough of a special manure handling system.

A further feature of the present invention is the provision of an add-on stall 60 which may be readily joined to the basic stall 10 in order to provide second adjoining stall. The add-on stall 60 comprises a single front support leg 12', a single rear support leg 16' and crossmembers 14' and 18', 20' and 22'. The transverse crossmembers 14' 18' are joined at the ends to the crossmembers 20' and 22' and support or extension rods 62 and 63 extend from the tubular crossmembers 14' and 18', respectively. The support rods 62 and 63 are adapted to be inserted into the adjacent open ends of tubular crossmembers 14' and 18', whereby the upright support legs 12 and 16 on the right side of the basic stall 10 (FIG. 1) serve a dual function in supporting components of both the basic stall and the add-on stall.

Telescopically received in the upright tubular support legs 12' and 16' are upright support members 24' and 26' which are constructed of the same U-shaped channel members as the upright support member 24 and 26 of the basic stall 10. It is intended that a wall member be inserted between the channel members 24' and 26' and that a tie rod 48' be secured to the upper ends of the upright members 24' and 26' so as to retain same in place. A wall member 30 of the basic stall 10 will thus serve as a common wall between basic stall 10 and the add-on stall 60. The wall members 30 may be comprised of a suitable material, as, for example, ⅝-inch plywood board. A grate 48 will be positioned in the add-on stall 60 and define the bottom thereof for supporting a calf.

It will be understood from the foregoing that the first stall in a row of stalls would be a basic stall 10 having four legs and that add-on stalls, one of which is shown in FIG. 1 and indicated generally at 60, would have two legs and would be telescopically engaged with a side of either the basic stall 10 or adjacent add-on stall 60. Thus as many add-on stalls with two legs as is desired can be secured in a row.

Basically, then, the novel stall arrangement of this invention includes tubular corner support legs which telescopically receive upright channel-type support members that in turn receive and retain plywood sidewalls. The support legs are interconnected by crossmembers that are welded or otherwise suitably secured to one another and to the legs for providing a rigid frame structure. The upper ends of the upright channel members are held together with tie rods after a wall member is positioned between associated pairs of upright channel members. The stall front and headguard are bolted to the front upright channel members 24 and the pail holders or feed-retaining means 40 are bolted or otherwise secured to the members 37 and 38 of the stall front. The self-cleaning rod grate is readily inserted and removed from the stall as desired.

There results from the present invention a stall arrangement of very sturdy construction which includes a self-cleaning grate bottom. The grate is comprised of cylindrical rodlike members spaced in such manner as to safely support an animal while at the same time permitting all droppings from the animal to readily pass through. The stall framework comprises members suitably coated or finished to resist rust. The sidewalls of the stall may be comprised of plywood. The novel stall arrangement is readily cleaned and disinfected and may be quickly assembled and installed due to its simplicity of design.

While we have shown a presently preferred form of the invention, it will be understood that our invention is not limited thereto, since it may be otherwise embodied within the scope of the following claims.

We claim:

1. An animal stall arrangement comprising a basic stall including first upright tubular support members, crossmembers interconnecting the first support members for retaining same in predetermined relationship to one another, second upright frame members telescopically received and supported by said first support members, said second frame members constructed and arranged for receiving wall members therebetween, a self-cleaning grate supported on said crossmembers for supporting an animal while permitting animal droppings to pass therethrough, the crossmembers comprising a pair of spaced-apart parallel longitudinal members and a pair of spaced-apart parallel transverse members, and an add-on stall adapted to be detachably joined to said basic stall, said add-on stall comprising a pair of upright tubular support members, a longitudinal member connected to said pair of upright tubular support members, a pair of transverse members each connected at one end to one of the pair of upright tubular support members and each carrying at the other end a support rod which is to be telescopically inserted into the end of one of the transverse members of the basic stall.

2. An animal stall arrangement as in claim 1 including a stall front secured to the forward pair of second upright frame members and feed support means on said stall front.

3. An animal stall arrangement as in claim 1 wherein the self-cleaning grate comprises a plurality of parallel rodlike members for supporting an animal, the rodlike members being spaced-apart sufficiently from one another to permit all droppings from the animal confined in the basic stall to readily pass therethrough while at the same time safely supporting the animal.

4. An animal stall arrangement as in claim 3 wherein the self-cleaning grate is removably supported on the crossmembers.

5. An animal stall arrangement comprising a basic stall including first upright tubular support members, crossmembers interconnected the first support members for retaining same in predetermined relationship to one another, second upright frame members telescopically received and supported by said first support members, said second frame members constructed and arranged for receiving wall members therebetween, tie rod means secured to the upper ends of associated pairs of second frame members and a self-cleaning grate supported on said crossmembers for supporting an animal while permitting animal droppings to pass therethrough, the self-cleaning grate comprising a plurality of parallel rodlike members for supporting an animal, the rodlike members being spaced-apart sufficiently from one another to permit all droppings from the animal confined in the basic stall to readily pass therethrough while at the same time safely supporting the animal, the self-cleaning grate being comprised of cylindrical rodlike members five-sixteenth inch in diameter, said rodlike members being spaced on one inch centers.

6. An animal stall arrangement comprising a basic stall including first upright tubular support members, crossmembers interconnected the first support members for retaining same in predetermined relationship to one another, second upright frame members telescopically received and supported by said first support members, said second frame members constructed and arranged for receiving wall members therebetween, and a self-cleaning grate supported on said crossmembers for supporting an animal while permitting animal droppings to pass therethrough, the self-cleaning grate including a plurality of spaced-apart transverse rods and at least a pair of retaining rods disposed generally longitudinally of the stall arrangement and spaced-apart a distance not greater than that between a pair of longitudinal crossmembers, the ends of the transverse rods extending beyond said retaining members, whereby the self-cleaning grate is carried on the said pair of longitudinal crossmembers by the ends of the rods, with the retaining rods functioning to properly orient the self-cleaning grate on said longitudinal crossmembers, said transverse rods being cylindrical in cross section.